United States Patent
Zheng et al.

(10) Patent No.: US 9,513,610 B2
(45) Date of Patent: Dec. 6, 2016

(54) APPARATUS AND METHODS FOR NON-INVASIVE CLOSED LOOP STEP TESTING USING A TUNABLE TRADE-OFF FACTOR

(71) Applicant: Aspen Technology, Inc., Burlington, MA (US)

(72) Inventors: Qingsheng Quinn Zheng, Sugar Land, TX (US); Magiel J. Harmse, Houston, TX (US)

(73) Assignee: Aspen Technology, Inc., Bedford, MA (US)

( * ) Notice: Subject to any disclaimer, the term of this patent is extended or adjusted under 35 U.S.C. 154(b) by 789 days.

(21) Appl. No.: 13/760,949

(22) Filed: Feb. 6, 2013

(65) Prior Publication Data

US 2013/0204403 A1 Aug. 8, 2013

Related U.S. Application Data

(60) Provisional application No. 61/596,459, filed on Feb. 8, 2012.

(51) Int. Cl.
*G05B 13/02* (2006.01)
*G05B 13/04* (2006.01)

(52) U.S. Cl.
CPC .......... *G05B 13/022* (2013.01); *G05B 13/048* (2013.01)

(58) Field of Classification Search
CPC .... G05B 5/01; G05B 13/024; G05B 13/022; G05B 13/048; F24F 11/006
USPC ......................................... 700/38
See application file for complete search history.

(56) References Cited

U.S. PATENT DOCUMENTS 5,301,101 A * 4/1994 MacArthur .......... G05B 13/026
                                                                                           360/75
5,640,491 A * 6/1997 Bhat .................... B01D 3/425
                                                                                           706/23

(Continued)

FOREIGN PATENT DOCUMENTS

JP       06-187004      7/1994
JP      2005-202934     7/2005

(Continued)

OTHER PUBLICATIONS

Zhao, et al., "An Identification Approach to Nonlinear State Space Model for Industrial Multivariable Model Predictive Control", *Proceedings of the American Control Conference*, Philadelphia, Pennsylvania, Jun. 1998.

(Continued)

*Primary Examiner* — Robert Fennema
*Assistant Examiner* — Jigneshkumar Patel
(74) *Attorney, Agent, or Firm* — Hamilton, Brook, Smith & Reynolds, P.C.

(57) ABSTRACT

An integrated multivariable predictive controller (MPC) and tester is disclosed. The invention system provides optimal control and step testing of a multivariable dynamic process using a small amplitude step for model identification purposes, without moving too far from optimal control targets. A tunable parameter specifies the trade-off between optimal process operation and minimum movement of process variables, establishing a middle ground between running a MPC on the Minimum Cost setting and the Minimum Move setting. Exploiting this middle ground, embodiments carry out low amplitude step testing near the optimal steady state solution, such that the data is suitable for modeling purposes. The new system decides when the MPC should run in optimization mode and when it can run in constrained step testing mode. The invention system determines when and how big the superimposed step testing signals can be, such that the temporary optimization give-away is constrained to an acceptable range.

20 Claims, 4 Drawing Sheets

(56) References Cited

U.S. PATENT DOCUMENTS

| | | | |
|---|---|---|---|
| 5,682,309 A * | 10/1997 | Bartusiak | G05B 13/048 700/29 |
| 6,056,781 A | 5/2000 | Wassick et al. | |
| 6,819,964 B2 | 11/2004 | Harmse | |
| 6,937,966 B1 | 8/2005 | Hellerstein et al. | |
| 7,085,615 B2 | 8/2006 | Persson et al. | |
| 7,209,793 B2 | 4/2007 | Harmse et al. | |
| 7,213,007 B2 | 5/2007 | Grichnik | |
| 7,330,804 B2 | 2/2008 | Turner et al. | |
| 8,560,092 B2 | 10/2013 | Zheng et al. | |
| 9,141,911 B2 | 9/2015 | Zhao et al. | |
| 2004/0249481 A1* | 12/2004 | Zheng | G05B 17/02 700/44 |
| 2005/0149208 A1* | 7/2005 | Harmse | G05B 17/02 700/29 |
| 2007/0225835 A1 | 9/2007 | Zhu | |
| 2013/0246316 A1 | 9/2013 | Zhao et al. | |

FOREIGN PATENT DOCUMENTS

| | | |
|---|---|---|
| JP | 2009-516301 | 4/2009 |
| WO | WO 2008/119008 A1 | 10/2008 |

OTHER PUBLICATIONS

Qin, et al., "A Survey of Industrial Model Predictive Control Technology", *Control Engineering Practice* 11 (2003).

International Preliminary Report on Patentability for International Application No. PCT/US2013/024932, "Apparatus and Methods for Non-Invasive Closed Loop Step Testing Using a Tunable Trade-Off Factor," dated Aug. 12, 2014.

Notification of Transmittal of the International Search Report and the Written Opinion of the International Searching Authority, or the Declaration, for International Application No. PCT/US2013/024932, dated May 2, 2013, consisting of 9 pages.

Soliman, M., "Multiple Model Predictive Control for Wind Turbines with Doubly Fed Induction Generators," *IEEE Transactions on Sustainable Energy*, vol. 2, No. 3, pp. 215-225 (2011).

\* cited by examiner

APPARATUS AND METHODS FOR NON-INVASIVE CLOSED LOOP STEP TESTING USING A TUNABLE TRADE-OFF FACTOR

RELATED APPLICATION(S)

This application claims the benefit of U.S. Provisional Application No. 61/596,459, filed on Feb. 8, 2012.

The entire teachings of the above application(s) are incorporated herein by reference.

BACKGROUND OF THE INVENTION

Multivariable Predictive Control (MPC) is the most widely used advanced process control technology in process industries, with more than 5,000 worldwide applications currently in service. MPC, which is sometimes also referred to as multivariate control (MVC), relies on dynamic models of an underlying process, e.g., linear dynamic models obtained by system identification.

A common and challenging problem is that MPC control performance degrades over time due to inevitable changes in the underlying subject process, such as equipment modifications, changes in operating strategy, feed composition changes, instrumentation degradation, etc. Such degradation of control performance results in loss of benefits. Among all possible causes of control performance degradation, the poor model accuracy is the primary factor in most cases. To sustain good control performance, the model needs to be periodically calibrated and updated.

However, it is a technically challenging and resource-intensive task to pinpoint a problematic model and re-identify a new model for replacement in a MPC application. Such efforts are disclosed in Assignee's U.S. Pat. Nos. 7,209,793 and 6,819,964. In a large scale MPC application, over a hundred variables may be involved. Conducting a re-test and re-identification by a conventional approach may take an experienced engineer weeks of intensive work and cause significant interruption to the normal operation.

The process industry has been looking for an automated, safe and less invasive approach to conducting plant testing for a while. In past generations of MPC's, a process control engine calculated a new steady state target every single control cycle, no matter how insignificant the increment change was. The new steady state target was then used to calculate a new dynamic move plan, and the first move was written out to the subject process. Doing so guaranteed that the process controller had an integration action that removed offset from the active CV (controlled variable) limits that were caused by measurement noise, process disturbances, and model errors; but this often caused unwarranted over-reaction to plant noise and the near colinearity present in the controller model. This lead to excessive feedback correlation in collected data sets making this closed loop data set unsuitable for model identification purposes. If purely closed loop data with the MPC system turned on was used, then the identified models were significantly biased (i.e., contained large errors). Often, the models identified from purely closed loop data were not sufficiently accurate to drive the correct behaviour in a non-square Multivariable Predictive Controller.

In the Assignee's U.S. Pat. No. 7,209,793, herein incorporated by reference, an innovative approach for conducting plant testing was proposed and improved on closed loop step testing of U.S. Pat. No. 6,819,964 also by Assignee and herein incorporated by reference. The step testing was done in an automated way with the process safe guarded by a specially designed multivariable controller. A process perturbation approach simultaneously perturbed multiple process input variables in a manner that maximized process outputs while maintaining process variables inside predefined operating constraints.

However, even using the above automated closed-loop step testing, the variable perturbation will inevitably have some negative impact to the normal process operation; mainly, the loss of optimal operation performance. As such, the currently available technology in this field is still considered too invasive to the process operation.

The innovation presented by Applicants below is geared to address this issue. Applicants provide a new apparatus and method for non-invasive closed loop step testing using a tunable trade-off between optimal process operation and process perturbation.

SUMMARY OF THE INVENTION

Embodiments of the present invention provide a new apparatus and method to address the foregoing problems by a tunable trade-off between optimal process operation and process perturbation.

Embodiments provide expansion of automated closed loop step testing techniques described in Assignee's U.S. Pat. No. 7,209,793 (Apr. 24, 2007). Embodiments can be configured and executed to generate required data for model quality assessment and/or model re-identification in Assignee's U.S. Patent Application Publication No. 2011/0130850 (published Jun. 2, 2011), while also minimizing negative impact to the underlying process operation, an improvement over the state of the art.

The present invention proposed approach also has robustness benefits. It has been observed that MPC type controllers often behave in a more stable way when all MVs (manipulated variables) are set to Minimum Move criterion, instead of Minimum Cost. This indicates that pushing for full optimization at every cycle may not always produce a better result; sometimes maintaining the current targets yield a better overall result.

Applicant's simulation results have confirmed that there is a middle ground between running the MPC controller on the Minimum Cost setting for all MVs, and running all MVs on the Minimum Move setting. Results have indicated that there is a tunable tradeoff between optimization and robustness. In particular, the end user can exploit this middle ground to carry out low amplitude step testing close to the optimal steady state solution, such that the data is suitable for modeling purposes. The challenge is on how to decide when the process controller engine should run in optimization mode (minimum cost criterion), and when it can run in a constrained step testing mode (using the minimum move criterion). For superimposing small but usable step testing signals onto the normal control action, the required innovation is in deciding when and how big these superimposed signals can be, such that the temporary optimization giveaway is constrained to an acceptable range. This is the basis of the present invention: A novel way to run a background small amplitude step test over multiple weeks or months that is suitable for model identification purposes, without moving too far away from optimal control targets.

An embodiment of the present invention is a method for increasing the robustness of a multivariable controller due to over reaction to unmeasured disturbance, model uncertainty and near colinearity while maintaining a process system to a specified optimal level. The method first involves specifying a trade-off factor (Delta J) representing the tolerance for the process system operating beneath a calculated optimal economic objective function for a current cycle of the multivariable controller and calculating targets for process manipulated (MV) and controlled variables (CV) using different objective functions.

In a preferred embodiment of this method, the objective functions for calculating these targets are economic optimization (min cost) and constraint control (min move). After the targets are calculated, the trade-off factor is employed to select the appropriate target. The target calculated from the economic optimization (min cost) function is selected if the incremental change in min cost objective function from the constraint control (min move) function exceeds the trade-off factor, otherwise, selecting the target calculated from the constraint control (min move) function. Finally, a dynamic move plan is generated from the selected target. The plan must comply with the constraints of the process being controlled. In one embodiment of this method, the dynamic move plan is implemented in the multivariable controller and the steps of the method are repeated for subsequent cycles.

In another embodiment, when the target calculated from the economic optimization (min cost) function is selected, the selector continues to select the target calculated from the economic optimization (min cost) function for subsequent cycles of the multivariable controller until a specified time has passed, such as the time to steady state of the process.

Another embodiment of the present invention is a method for both optimal control and step testing of a multivariable dynamical process. This embodiment further includes maintaining the economic optimization of a process operation to a certain extent while automatically perturbing the process at the same time. The method uses the tunable parameter (Delta J) to specify the trade-off between economic optimization of the process operation and aggressiveness of the process perturbation. In this embodiment, an existing process control model in the multivariable controller is specified as an initial model and a given trade-off factor (Delta J) represents the allowable economic objection function degradation. Subsequently, when the controller is running in min move mode, a step signal is calculated for a selected list of process manipulated (MV) signals to be stepped, these steps are subject to the process constraints and the economic function degradation limit. A move plan is generated combining nominal control and said step testing signals and implemented in the multivariable controller. After implementation, the process manipulated (MV) and process controlled (CV) response variables are measured and used to improve the model.

In accordance with one aspect of the present invention, the method employs a process output margin (CV active constraint relaxation) to prevent the target of process variables from approaching singularities due to near colinearity in the model.

In accordance with another aspect of the present invention, the step signals calculated for a selected list of process manipulated (MV) signals to be stepped includes the use of simultaneous process manipulated (MV) steps to move away from the required process constraint instead of a single MV step.

In another embodiment the present invention, the method of step testing the process system and improving a process model is repeated until a desired model condition is reached.

Another embodiment of the present invention is an apparatus for increasing the robustness of a multivariable controller comprising a multivariable controller coupled to a process system, a computer means coupled to the multivariable controller, and a user interface coupled to the computer means. The user interface allows a user to tune a trade-off factor (Delta J), representing the tolerance for the process system operating beneath a calculated optimal economic objective function, between optimal process operation and process perturbation. The computer means accepts the user settable value for the trade-off factor for a current cycle of the multivariable controller, calculates targets for process manipulated (MV) and controlled variables (CV) using a function for economic optimization (min cost) and a function for constraint control (min move), selects the calculated target to be used based on the trade-off factor, generates a dynamic move plan from the selected target, and implements the dynamic move plan in the multivariable controller, the dynamic move plan complying with required process constraints.

In accordance with one aspect of the present invention, the computer means selects the target calculated from the economic optimization (min cost) function if the incremental change in min cost objective function from the constraint control (min move) function exceeds the trade-off factor, otherwise, selecting the target calculated from the constraint control (min move) function.

In accordance with another aspect of the present invention, when the computer means selects the target calculated from the economic optimization (min cost) function, the computer means continues to select the target calculated from the economic optimization (min cost) function for subsequent cycles of the multivariable controller until a specified time has passed, such as the time to steady state of the process.

Another embodiment of the present invention is the apparatus including an online integrated multivariable controller and tester to automatically perturb the process while maintaining the process safety and optimal operation performance. The computer means uses an existing process control model in the multivariable controller as an initial model and the specified trade-off factor (Delta J) as a tolerance representing the allowable economic objection function degradation. When the controller is running in min move mode, the computer means calculates a step signal for a selected list of process manipulated (MV) signals to be stepped, subject to the process constraints and the economic function degradation limit, and generates a move plan combining nominal control and said step testing signals. The computer means implements the move plan in the multivariable controller, measures process manipulated (MV) and process controlled (CV) response variables, and updates the initial model with the measured response variables to improve the model.

In accordance with one aspect of the present invention, the computer means employs a process output margin (CV active constraint relaxation) to prevent the target of process variables from approaching singularities due to near colinearity in the model.

In accordance with another aspect of the present invention, computer means calculating the step signals further includes the use of simultaneous process manipulated (MV) steps to move away from the required process constraint instead of a single MV step.

In yet another embodiment of the present invention, computer means repeatedly implements move plans with step testing signals and measures the response variables, and further improves the model of the process system.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The teachings of all patents, published applications and references cited herein are incorporated by reference in their entirety.

Figure 1:
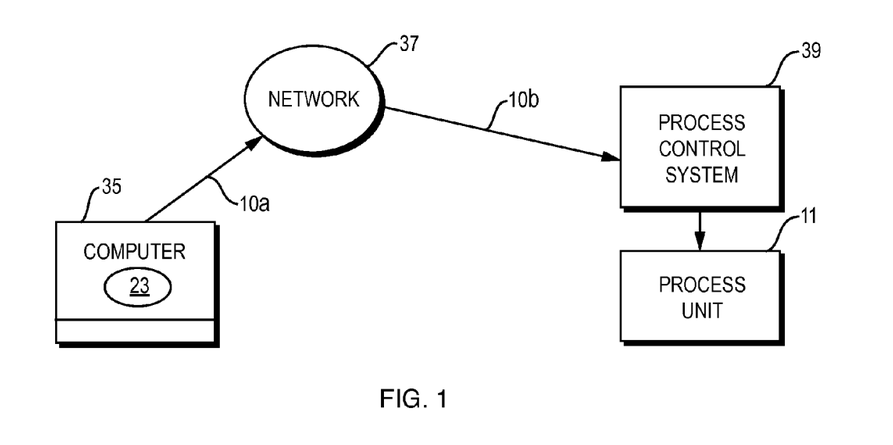
FIG. 1 is a schematic view of a multivariable process control system embodying the present invention.

Illustrated in FIG. 1 is a multivariable process controller (or MPC controller) 23 embodying the present invention. In the preferred embodiment, the multivariable process controller 23 is implemented in software, hardware, or both executed on computer processing means 35. The computer processing means 35 is coupled in communication (for example, via a network 37) with process control system 39. The process control system 39 controls the subject process 11 using techniques and mechanics common in the art. The network 37 may be a local area network (LAN), a wide area network (LAN) and/or part of a global network (e.g., the Internet). Network 37 provides access to computer means 35 and process control system 39 across communication lines 10a and 10b and the like common in the art. In the preferred embodiment, communication lines 10a and 10b are high speed communication links which enable remote access/operation of the invention controller 23.

Computer processing means 35 includes memory (RAM, ROM, etc.), a central processing unit (CPU), I/O interfaces and a network interface. The I/O (input and output) interfaces support cursor control devices (keyboard, mouse, etc.) and display drivers (to computer monitors and other output devices). The network interface supports connection and communication to network 37. The central processor unit (CPU) is coupled in communication with the memory and executes instructions store therein, inducing supporting a user interface through the I/O interface and implementing embodiment of the present invention MPC controller 23.

Embodiments provide a new apparatus and method for carrying out process perturbation in a non-invasive way, which means that a tunable trade-off can be made between operation optimization and perturbation. In embodiments, when in "calibration mode", the MPC program 23 monitors if there is any change in tuning (Gain Multipliers, MV/CV service switches, operator limit adjustment, LP/QP cost factor change, etc.) that warrants a large change in operating point (i.e., or if the unbiased prediction error has exceeded a specified tolerance indicating the presence of a large disturbance that requires control action). When this happens, the present invention algorithm runs the MVC control engine (at 23) for one cycle with its native settings. The MPC program/controller 23 then evaluates the calculation result returned from the control engine. If it determines that the steady state result differs significantly from the current values, the MPC program implements the result (accepts the new LP targets) and moreover, keeps the control engine running in its native settings for one full time to steady state (TTSS). If the MPC program 23 determines that the new result is insignificant (less than the user specified economic give-away threshold), it forfeits the result and continues with the minimum move setting, maintaining the prior LP steady state targets.

When the MPC application 23 runs in minimum move setting with the economic give-away threshold being respected, the program tries to inject step test signals for all the manipulated variables (MV) that are set up for testing purposes. The signal generation uses the same mechanism as in MultiTest engine in Aspen SmartStep™ (U.S. Pat .Nos. 6,819,964 and 7,209,793 herein incorporated by reference in their entirety). However, the step size is verified and adjusted to comply with a user defined optimization give-away parameter. The step size is scaled back to meet the economic give-away threshold specified by the user. This allows the user to control the cost of the step test. A smaller threshold will limit the product give-away, but adversely affect the quality of the data and therefore amount of data required for reliable model identification, prolonging the duration of the test. The test will take much longer, but will be sufficiently benign so that the operator can supervise it. It also provides a way for an MPC controller with a model that is out of calibration to run in a detuned but robust fashion while new calibration data is generated.

Figure 2A:
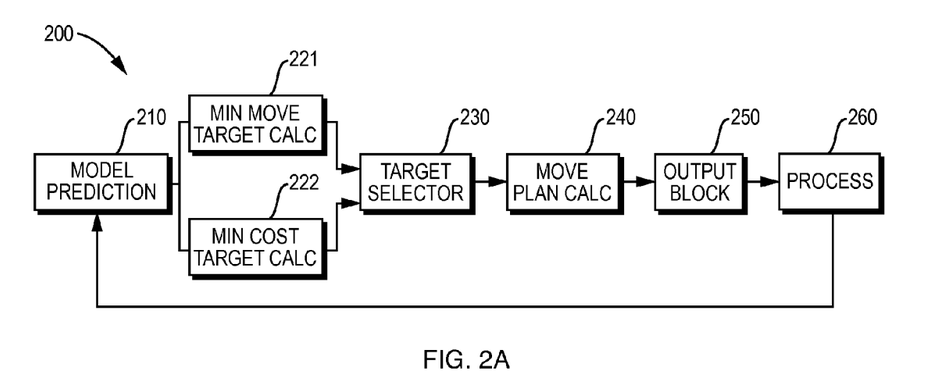
FIG. 2A is a system diagram of an embodiment of the present invention.
Figure 2B:
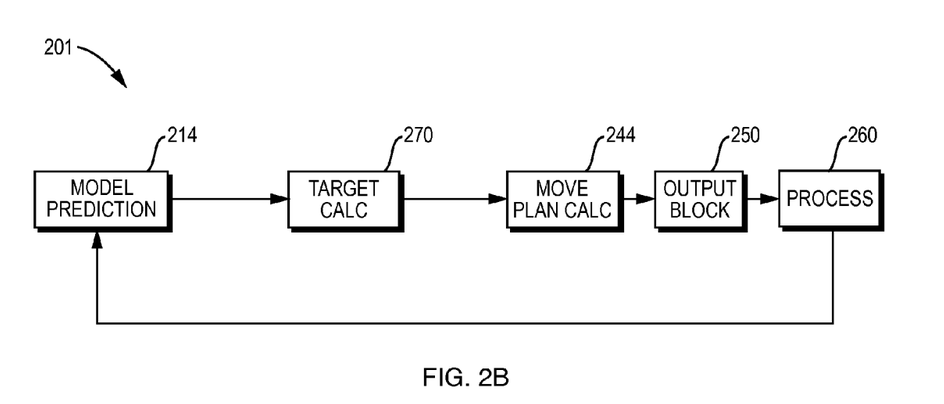
FIG. 2B is a system diagram of an embodiment of a traditional approach.

As shown in FIG. 2B, in a typical Model Predictive Controller 214 (such as older versions of DMCplus by Aspen Technology Inc. of Burlington, Mass.), the controller engine 270 calculates a new steady state target every single cycle, no matter how insignificant the incremental change is. The new steady state target 270 is then used to calculate a dynamic move plan 244, and the first move is written out (through 250) to the subject process 260.

FIG. 2A is a system diagram of an embodiment 23 of the present invention 200. The Model Prediction block 210 generates predictions for each Controlled Variable (CV) of the process based on the model, past inputs and previous prediction errors. At each execution cycle, a new target is calculated for each CV (Controlled Variable) and MV (Manipulated Variable) based on an Objective Function (J) and subject to the process constraints. Unlike in a traditional configuration 201, embodiments 23 of the present invention 200 contain two Objective Functions: one is designed for Operation Optimization 222 (profit maximization, or cost minimization; we will use the term "Min Cost" throughout the discussion), and another is designed for Minimum Move Control 221 (constraint control; we will use the term "Min Move" throughout the discussion).

The Target Selector block 230 decides which calculated targets 221, 222 are to be used for the current execution cycle. The decision is based on a user tunable parameter (i.e., user selectable value) "Delta J," which represents how much trade-off is allowed between Min Cost and Min Move. The Target Selector 230 sends the final target to Move Plan Calc block 240 where a dynamic move plan is produced. The dynamic move plan is responsible to drive the subject process 260 towards the required target over a certain period of operation time.

The Output block 250 is responsible for validating and implementing the move plan 240 cycle by cycle in the Process 260 (at 11 in FIG. 1). Normally, it includes writing out signals to the process actuators through a DCS system 39 (FIG. 1).

To demonstrate the novelty of the invention, a system diagram for a typical implementation 201 of MPC in the prior art is illustrated in FIG. 2B for comparison purposes. Note, it has only a single target calculation engine 270 and no condition based target selector in contract to the two objection function target calculation engines 221, 222 and target selector 230 of the present invention.

Figure 3:
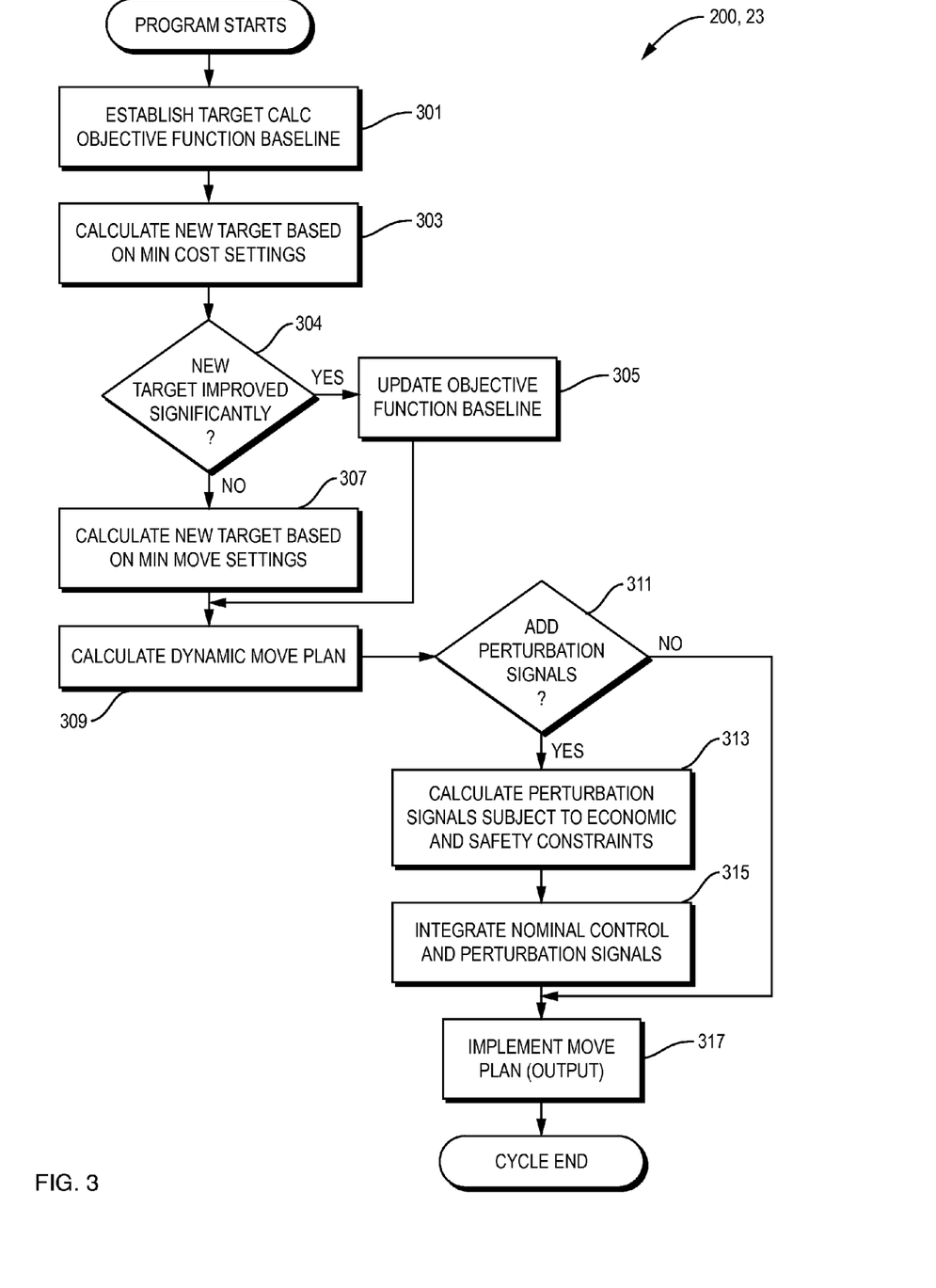
FIG. 3 is a flow diagram of method embodiments of the invention.
Figure 4:
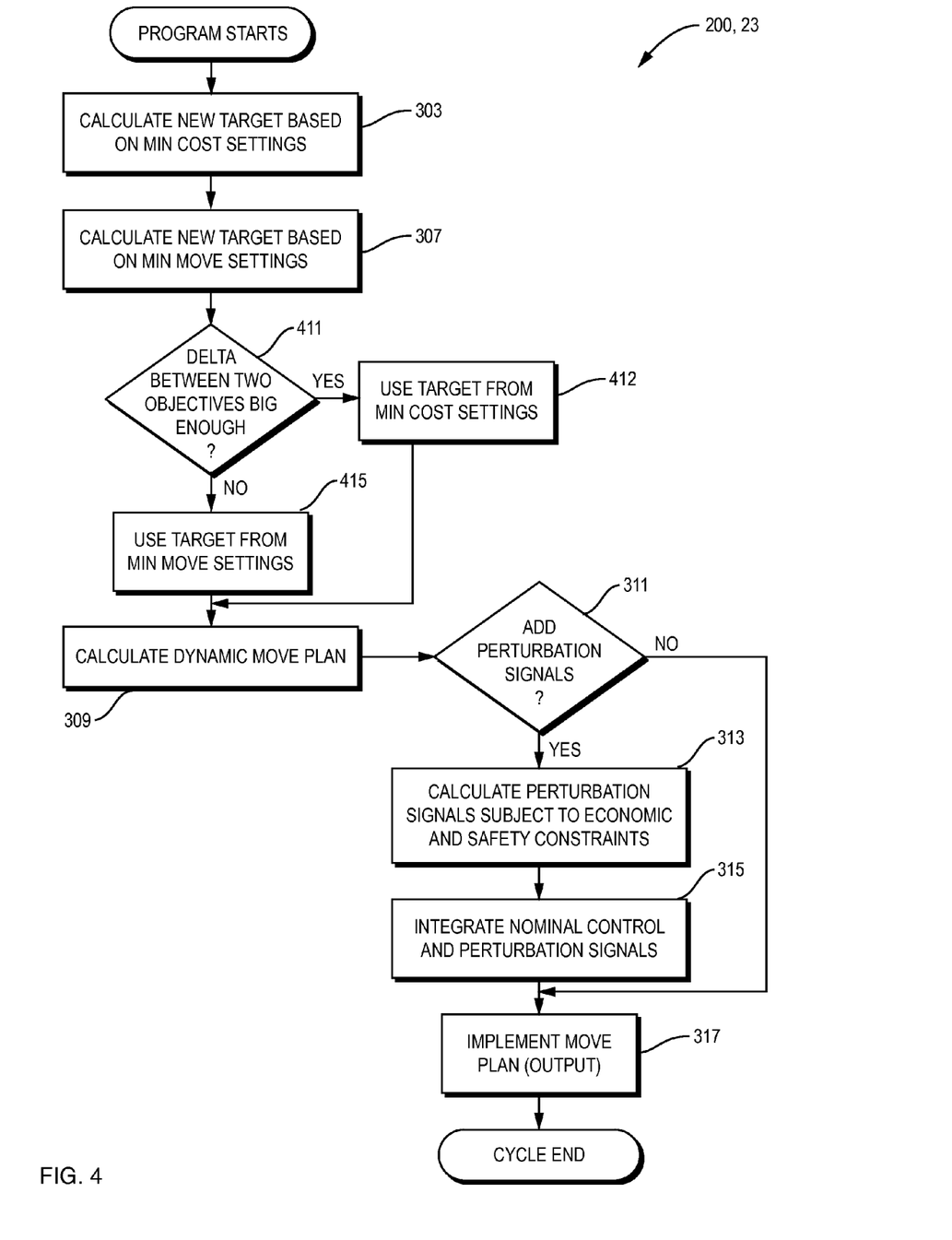
FIG. 4 is an alternative flow diagram of method embodiments of the invention.

FIG. 3 and FIG. 4 are flow diagrams of two example embodiments 200, 23 of the present invention. To facilitate the discussion, the following notations are used:

A generic multivariable process can be described as:

$$Y = G*U \quad (1)$$

Where, G is the transfer function or gain matrix, U and Y are input variables and output variables, respectively $$U = [u_1, u_2, \ldots, u_m], m \geq 1$$

$$Y = [y_1, y_2, \ldots, y_n], n \geq 1$$

The process operation constraints can be described as:

$$UL \leq U \leq UH \quad (2)$$

$$YL \leq Y \leq YH \quad (3)$$

Where, UL and UH are input variable low and high limits, and YL and YH are output variable low and high limits, respectively.

$J(x)$ is an objective function representing certain measure about variable x.

In practice, one may not be able to find a feasible solution such that equations (1), (2) and (3) are satisfied simultaneously, which means that some of CV variables have to give up their limits. It is a common practice that a set of achievable CV limits is identified first before the calculation of MV and CV targets:

$$\min_U J(E)$$

such that $$Y = G*U + E, \text{and } (2), (3)$$

Where, E is a relaxation vector. Then, the achievable CV limts, YL* and YH*, are defined as:

$$yl_i^* = yl_i + e_i, \text{if } e_i < 0$$

$$yh_i^* = yh_i + e_i, \text{if } e_i > 0$$

$$i = 1, 2, \ldots, n \quad (4)$$

For the sake of simplicity without loss of generality, we assume that the achievable CV limits are always used in the target calculations in the place of nominal CV limits for the remaining discussions.

Establish Objective Function Baseline 301

A baseline for the Min Cost objective function, $J_{cost}$, represents the best achievable value for the operation optimization based on the current settings and process constraints. To establish this baseline (step 301), the Target Selector 230 chooses the calculated target from the Min Cost module 222 for a certain time period (normally the process Time to Steady State) or until the underneath process 11, 260 reaches its optimum.

Another way to establish 301 a baseline is to calculate the Min Cost objective function 222 assuming that the current operating points are at the middle of the operating range and the new targets are at their high or low operating limits, depending on each variable's economic optimizing direction.

Calculate New Target Using Min Cost Configuration 303

Controller 23 target calculation for Min Cost can be represented by a objective function consisting of cost factors associated with each MV (or other variations), subject to process constraints such as MV and CV limits:

$$\min_U J_{cost}(U) \quad (5)$$

Where, $J_{cost}(U) = \sum_{i=1}^{i=n} c_i * u_i$ and $c_i$ is the cost factor for variable i.

The results from the Min Cost target calculation 222 normally will force the process variables moving to its active constraints (all degrees of freedom are consumed and the dynamic move plan 240 will try to keep variables staying at these active limits). It is a well known fact that the harder the MPC controller 23 pushes variables to the active constraints, the more vulnerable the process 11 will be to uncertainties (disturbances, model errors and near colinearity, actuator defect, etc.).

Calculate New Target Using Min Move Configuration 307

In contrast to Min Cost, Min Move target calculation 221 is represented by a objective function consisting of MV move penalities. The further a MV moves away from its current value, the higher penality it gets, subject to process constraints such as MV and CV limits:

$$\min_U J(U - U^*) \quad (6)$$

Where, U* are the current values for MVs.

The results from Min Move target calculation 221 normally will keep MV staying where it is currently unless it has to make a move to relieve a CV constraint violation. In other words, if there is no CV constraint violation, MV should stay still. Similar to the effect of using Move Suppression in the dynamic move plan calculation 240 for the robustness of controller 23 performance, using Min Move target calculation 221 can result in a less sensitive controller 23 when facing high uncertainties.

However, the conventional Min Move target calculation 221 may still be problematic when there exists near colinearity in the model matrices. Near colinearity in MV and CV relationship may cause MVs to flip-flop when the associated CVs become actively constrained. In the present invention, Applicants have made modification to the traditional Min Move calculation 221 to address this issue, as discussed below.

Practically, there is always certain uncertainty around each CV. If we allow each CV or a selected list of CVs to have certain tolerance in constraint violation, we can then solve equation (6) subject to a relaxed CV constraint set instead of the original constraint set:

$$YL - Y_{dt} \leq Y \leq YH + Y_{dt} \quad (7)$$

Where $Y_{dt}$ represents the vector of allowable CV violation tolerance or CV Margin.

Select Target 304, 305

Due to changes in operation requirement, process condition, controller tuning, unmeasured disturbances and model uncertainties, etc., the calculated controller target will vary from time to time. The current common practice in MPC is to update the target from cycle to cycle. When uncertainties are high, this commonly adopted approach may result in an unstable or poorly performing controller. In the present invention, a Target Selector 230 is introduced to balance the optimization versus the robustness of the MPC controller 23. Practically, a better balanced MPC controller can create a better end result then a mathematically fully optimized controller (an unstable or poorly performing controller may get turned off by an operator, for instance).

Provided with a tunable parameter, Delta J, the selector 230 decides which target is to be used for a particular cycle by comparing the Min Cost objective function to the Min Move objection function. Steps 304 and 305 of FIG. 3 are illustrative. That is, if the change in Min Cost objective function 222 is smaller than Delta J, then the selector 230 selects the target from Min Move calculation 221. And if the change in Min Cost objective 222 function is larger than Delta J, the selector selects the target from Min Cost calculation 222. The objective function baseline is also updated 305 using the newly calculated Min Cost value in this case.

Calculate Dynamic Move Plan 309

When a target is chosen, the MPC controller 23 calculates a dynamic move plan 240 (step 309 in FIG. 3). This move plan 240 is designed to bring the process variables to the new targets as fast as possible, subject to the process 11, 260 and actuator constraints.

Calculate Perturbation Signals 311, 313, 315

Optionally, a perturbation signal can be added onto the Dynamic Move Plan 240 for each or a selected list of MVs. This is done only if the selected target is from Min Move Target Calculation 221, which means that the process has finished moving into the optimal operation range governed by Delta J. Steps 311, 313, and 315 of FIG. 3 are illustrative.

For the perturbation signal of a MV, the step size is calculated in such a way that all process constraints are honored or will not make the existing violation even worse (step 313). For an integrating CV, the step size calculation at 313 also observes the rate of change of the ramping dynamics. More detailed discussion on how a step size is calculated can be found in Assignee's U.S. Pat. No. 7,209,793 herein incorporated by reference in its entirety.

Figure 5:
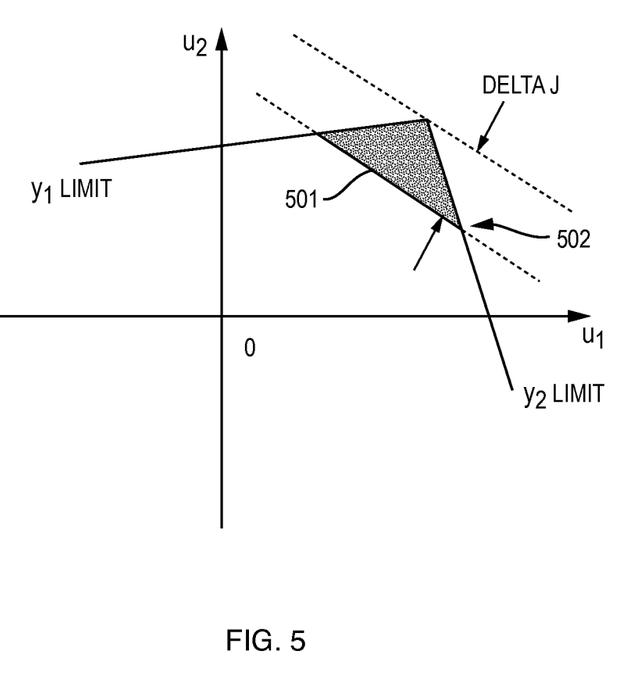
FIG. 5 is an illustrative plot of the allowable perturbation area defined by a process constraints and an optimization giveaways tolerance.

An improvement for step signal calculation has been introduced in the present invention on the basis of the invention in Assignee's U.S. Pat. No. 7,209,793. The step size calculation of step 313 also honors the allowable tolerance in the operation optimization loss as defined by the Min Cost objective function. FIG. 5 illustrates this improvement where the shaded area is defined by the process constraints ($y_1$, $y_2$) and Delta J, the optimization giveaways tolerance. The perturbation signal is calculated by maximizing the step size subject to the constraints of the shaded area 501.

In the case that the current operating point is at a corner, such as the corner point 502 in FIG. 5, it is not feasible to just step one MV without violating the constraints. When this happens, the perturbation calculation engine can step multiple MVs simultaneously, such as along the CV active constraint line. For example, if it is a 2 by 2 model matrix and the active constraint is on $y_1$, stepping along the CV active constraint line means that $u_1$ step and $u_2$ step should satisfy $$\frac{u_1}{u_2} = -\frac{g_2}{g_1}$$

Where, $g_1$ and $g_2$ are the model gains between $y_1$ and $u_1$ and $y_1$ and $u_2$, respectively.

In mathematic form, the step size is calculated by:

$$\max_{U\{a\}} J(U\{a\} - U^*\{a\}) \quad (8)$$

such that $$J_{cost}(U) - J_{cost}(U^*) \leq \text{Delta } J \text{ and } (1),(2),(3)$$

Where, $J_{cost}$ is the Min Cost objective function 222 and $\{a\}$ denotes a subset of MVs to be stepped.

Integrate Nominal Control and Perturbation Move Plan 315

After the nominal control and perturbation signals are calculated (at 313), the two move plans need to be integrated for output. Normally, the signals from the nominal control move plan is zero. If not zero, it means that there is active CV constraint violation and a compensating move is needed; this is because the perturbation move is a static move and it only happens at the time when a step is initiated, while the nominal control move is updated each control cycle.

Output Move Plan 317

At step 317, the integrated move plan 240 is implemented over a certain number of execution cycles, complied with the dynamic constraint of the process 11, 260 and actuators. Normally, a large move needs be divided into multiple smaller moves over a certain time period without upsetting the process operation 260. If the control signal moves in the opposite direction of the step move, any unfinished step move is suspended.

FIG. 4 illustrates an alternative MPC controller 23 of the present invention. This embodiment 200 begins with step 303, calculates a new target using Min Cost target calculation 222 as disclosed above, then step 307 calculates a new target using Min Move target calculation 221 as disclosed above. Next, target selector 230 balances the optimization versus the robustness of the MPC controller 23. In particular, target selector 230 (at steps 411 and 412) determines whether the difference between the Min Cost objective function (Min Cost target calculation 222) at the Min Move objective function (Min Move target calculation 221) is sufficiently large, i.e., meeting user definable threshold (parameter Delta J). If not, then target selector 230 uses the target settings from Min Cost calculation 222 (at step 412). If not, then target selector 230 uses the target settings from the Min Move calculation 221 (step 415). MPC controller 23 continues with steps 309-317 as described above in FIG. 3.

While this invention has been particularly shown and described with references to example embodiments thereof, it will be understood by those skilled in the art that various changes in form and details may be made therein without departing from the scope of the invention encompassed by the appended claims.

What is claimed is:

1. A computer based method for increasing the robustness of a multivariable controller due to over reaction to unmeasured disturbance, model uncertainty and near colinearity while maintaining a process system to a specified optimal level, the method comprising:
   receiving a user specified value for a trade-off factor (Delta J) representing a range between the process system operating at a calculated optimal economic objective function for a current cycle of the multivariable controller and the process system operating by using a minimum amount of moves;
   calculating targets for process manipulated variables and controlled variables using different objective functions;
   selecting the calculated target to be used based on the trade-off factor; and generating a dynamic move plan from the selected target, the dynamic move plan complying with required process constraints of the process system.

2. The method of claim 1 wherein the objective functions for calculating the targets for process manipulated and controlled variables is one of: a function for economic optimization (min cost) and a function for constraint control (min move).

3. The method of claim 2 wherein selecting the calculated target to be used based on the trade-off factor further includes: selecting the target calculated from the economic optimization (min cost) function if the incremental change in min cost objective function from the constraint control (min move) function exceeds the trade-off factor, otherwise, selecting the target calculated from the constraint control (min move) function.

4. The method of claim 3 further including: upon selecting the target calculated from the economic optimization (min cost) function, continuing to select the target calculated from the economic optimization (min cost) function for subsequent cycles of the multivariable controller until a specified time has passed, including the time to steady state of the process.

5. The method of claim 1 further comprising:
performing one or more of said receiving, calculating, selecting, and generating;
implementing the dynamic move plan in the multivariable controller; and
repeating the performing and implementing until meeting a predetermined termination criteria.

6. The method of claim 1, further comprising:
specifying an existing process control model in the multivariable controller as an initial model;
using the specified trade-off factor (Delta J) as a tolerance representing the allowable economic objection function degradation;
when the controller is running in min move mode, calculating a step signal for a selected list of process manipulated variables signals to be stepped, subject to the process constraints and the economic function degradation limit;
generating a move plan combining nominal control and said step testing signals;
implementing the move plan in the multivariable controller;
measuring process manipulated variables and process controlled response variables; and
updating the initial model with the measured response variables to improve the model.

7. The method of claim 6, further comprising: employing a process output margin (CV active constraint relaxation) to prevent the target of process variables from approaching singularities due to near colinearity in the model.

8. The method of claim 6, wherein calculating a step signals for a selected list of process manipulated variable signals to be stepped further includes the use of simultaneous process manipulated variable steps to move away from the required process constraint instead of a single process manipulated variable step.

9. The method of claim 6 further comprising:
determining whether the updated initial model satisfies one or more predetermined criteria;
upon a condition in which the model does not satisfy the predetermined criteria:
performing one or more of receiving user specified trade-off factor, calculating steady state targets, selecting the calculated steady state target, generating a dynamic move plan, specifying an existing process control model, using the specified trade-off factor, calculating a step signal, generating a move plan, implementing the move plan, measuring the response variables, and updating the initial model; and
repeating the determining and the conditional performing until meeting a predetermined termination criteria.

10. An apparatus for increasing the robustness of a multivariable controller comprising:
a multivariable controller coupled to a process system;
a computer means coupled to the multivariable controller, the computer means:
accepting a user specified trade-off factor (Delta J) representing a range between the process system operating at calculated optimal economic objective function for a current cycle of the multivariable controller and the process system operating by using a minimum amount of moves,
calculating targets for process manipulated variables and controlled variables using different objective functions,
selecting the calculated target to be used based on the trade-off factor, and
generating a dynamic move plan from the selected target, the dynamic move plan complying with required process constraints; and
a user interface coupled to the computer means, the user interface configured to enable a user to tune the trade-off factor between optimal process operation and process perturbation.

11. The apparatus of claim 10, wherein the objective functions for calculating the targets for process manipulated and controlled variables is at least one of: a function for economic optimization (min cost) and a function for constraint control (min move).

12. The apparatus of claim 10, wherein the computer means selects the target calculated from the economic optimization (min cost) function if the incremental change in min cost objective function from the constraint control (min move) function exceeds the trade-off factor, otherwise, selects the target calculated from the constraint control (min move) function.

13. The apparatus of claim 10, wherein when the computer means selects the target calculated from the economic optimization (min cost) function, the computer means continues to select the target calculated from the economic optimization (min cost) function for subsequent cycles of the multivariable controller until a specified time has passed, including the time to steady state of the process.

14. The apparatus of claim 10, wherein:
the computer means implements the dynamic move plan in the multivariable controller; and
the computer means repeats the accepting, calculating, selecting, generating and implementing until meeting a predetermined termination criteria.

15. The apparatus of claim 10, wherein the computer means further:
specifies an existing process control model in the multivariable controller as an initial model;
uses the user specified trade-off factor (Delta J) as a tolerance representing the allowable economic objection function degradation;
calculates a step signal for a selected list of process manipulated variable signals to be stepped when the controller is running in min move mode subject to the process constraints and the economic function degradation limit;

generates a move plan combining nominal control and said step testing signals;

implements the move plan in the multivariable controller;

measures process manipulated variables and process controlled response variables; and updates the initial model with the measured response variables to improve the model.

16. The apparatus of claim 15, wherein the computer means employs a process output margin (CV active constraint relaxation) to prevent the target of process variables from approaching singularities due to near colinearity in the model.

17. The apparatus of claim 15, wherein the computer means calculating a step signals for a selected list of process manipulated variable signals to be stepped further includes the use of simultaneous process manipulated variable steps to move away from the required process constraint instead of a single MV step.

18. The apparatus of claim 15, wherein:

the multivariable controller utilizes the updated model to control the process system; and the computer means repeatedly implements move plans with step testing signals and measures the response variables, and further improves the model of the process system.

19. A computer program product in a multivariable controller coupled to a process system, comprising:

a non-transitory computer readable storage medium in the multivariable controller having stored thereon a set of computer program instructions;

said set of program instructions being executed by a processor of the multivariable controller and increasing the robustness of the multivariable controller while maintaining the process system to a specified optimal level, the instructions executed by the processor comprising:

obtaining a user specified trade-off factor (Delta J) representing a range between the process system operating at a calculated optimal economic objective function for a current cycle of the multivariable controller and the process system operating by using a minimum amount of moves;

using different objective functions, the objective functions for calculating the targets for process manipulated and controlled variables includes: a function for economic optimization (min cost) and a function for constraint control (min move);

selecting the target calculated from the economic optimization (min cost) function if the incremental change in min cost objective function from the constraint control (min move) function exceeds the trade-off factor, otherwise, selecting the target calculated from the constraint control (min move) function, and upon selecting the target calculated from the economic optimization (min cost) function, continuing to select the target calculated from the economic optimization (min cost) function for subsequent cycles of the multivariable controller until a specified time has passed, including the time to steady state of the process; and generating a dynamic move plan from the selected target, the dynamic move plan complying with required process constraints.

20. The computer program product of claim 19, wherein the set of program instructions being executed by a computer for increasing the robustness of a multivariable controller further comprises:

specifying an existing process control model in the multivariable controller as an initial model;

using the user specified trade-off factor (Delta J) as a tolerance representing the allowable economic objection function degradation;

employing a process output margin (CV active constraint relaxation) to prevent the target of process variables from approaching singularities due to near colinearity in the model;

when the controller is running in min move mode, calculating a step signal for a selected list of process manipulated variable signals to be stepped, subject to the process constraints and the economic function degradation limit;

generating a move plan combining nominal control and said step testing signals implementing the move plan in the multivariable controller;

measuring process manipulated variables and process controlled response variables; and updating the initial model with the measured response variables to improve the model.

* * * * *